US011130402B2

(12) United States Patent
Chirco

(10) Patent No.: US 11,130,402 B2
(45) Date of Patent: Sep. 28, 2021

(54) DRIVE GEAR INCLUDING INTEGRATED TARGET PATTERN

(71) Applicant: BorgWarner Inc., Auburn Hills, MI (US)

(72) Inventor: Christopher Anthony Chirco, Romeo, MI (US)

(73) Assignee: BorgWarner Inc., Auburn Hills, MI (US)

( * ) Notice: Subject to any disclaimer, the term of this patent is extended or adjusted under 35 U.S.C. 154(b) by 404 days.

(21) Appl. No.: 16/025,606

(22) Filed: Jul. 2, 2018

(65) Prior Publication Data

US 2020/0001712 A1 Jan. 2, 2020

(51) Int. Cl.

| | |
|---|---|
| ***B60K 23/00*** | (2006.01) |
| ***B60K 23/08*** | (2006.01) |
| ***G01D 5/252*** | (2006.01) |
| ***B60K 17/344*** | (2006.01) |

(52) U.S. Cl.
CPC ........ *B60K 23/0808* (2013.01); *B60K 17/344* (2013.01); *G01D 5/2525* (2013.01)

(58) Field of Classification Search
CPC . B60K 23/0808; B60K 17/344; G01D 5/2525
See application file for complete search history.

(56) References Cited

U.S. PATENT DOCUMENTS 4,602,603 A * 7/1986 Honkanen ............. F02D 41/009 123/406.47
9,186,987 B2 11/2015 Mastie et al.
9,447,873 B2 9/2016 Pritchard
2016/0138940 A1* 5/2016 Kurmaniak .......... G01D 5/2497 324/207.2
2017/0158052 A1* 6/2017 Hamilton ............... B60K 23/08
2017/0158053 A1* 6/2017 Bunyan ................ B60K 17/344

* cited by examiner

*Primary Examiner* — Victor L MacArthur
(74) *Attorney, Agent, or Firm* — Young Basile Hanlon & MacFarlane, P.C.

(57) ABSTRACT

A transfer case is disclosed that includes an input shaft, a primary output shaft, a secondary output shaft, a gear reduction mechanism that selectively couples the input shaft to the primary output shaft in a high range and a low range, a secondary torque transfer mechanism that operates to selectively couple the primary output shaft to the secondary output shaft to engage a four-wheel drive mode, and an actuation mechanism that operates the gear reduction mechanism and the secondary torque transfer mechanism. The actuation mechanism includes a gear plate with an integral target pattern that is rotatable through a plurality of positions corresponding to states of the gear reduction mechanism and the secondary torque transfer, as well as a sensor that is adapted and positioned to read the target pattern to in each of the positions of the gear plate.

18 Claims, 12 Drawing Sheets

DRIVE GEAR INCLUDING INTEGRATED TARGET PATTERN

CROSS-REFERENCE TO RELATED APPLICATIONS

None.

TECHNICAL FIELD

The present disclosure relates to electromechanical transfers cases for vehicles, and more specifically, to position control of a drive gear.

BACKGROUND

In the field of vehicle drivetrain components, a transfer case is an apparatus that receives driving power from the transmission of the vehicle and transmits that power to the axle(s). In multi-speed transfer cases, one or more reduction gears are provided to allow for operation through a variety of ranges, for example, a high range, typically a 1:1 drive ratio, and a low range, typically a 2:1 drive ratio. During the operation of such systems, power is transmitted through the reduction gear(s) to a drive gear assembly, which generally includes one or more internal plates/gears.

A system allowing for added positional control over the internal components of the drive gear assembly would be advantageous in order to increase the accuracy of shift system actuation. The present disclosure addresses this need by providing a drive gear assembly that includes a drive gear with an integral target pattern readable by a contactless sensor. The sensor is configured, positioned, and adapted to read the target pattern to ascertain the rotational position of the drive gear and provide positional feedback useful in optimizing shift system actuation.

SUMMARY

In one aspect of the present disclosure, a transfer case is disclosed that includes an input shaft, a primary output shaft, a secondary output shaft, a gear reduction mechanism that selectively couples the input shaft to the primary output shaft in a high range and a low range, a secondary torque transfer mechanism that operates to selectively couple the primary output shaft to the secondary output shaft to engage a four-wheel drive mode, and an actuation mechanism that operates the gear reduction mechanism and the secondary torque transfer mechanism. The actuation mechanism includes a gear plate with an integral target pattern that is rotatable through a plurality of positions corresponding to states of the gear reduction mechanism and the secondary torque transfer mechanism and in which the integral target pattern differs, as well as a sensor that is adapted and positioned to read the target pattern to in each of the positions of the gear plate (e.g., to identify the position of the gear plate).

In certain embodiments, the target pattern may include a plurality of windows and a plurality of solid areas.

In certain embodiments, the windows and the solid areas may collectively define a plurality of sectors that are spaced radially from a center point of the gear plate and a plurality of zones that are spaced angularly from one another.

In certain embodiments, the gear plate may be rotatable in relation to the sensor such that rotation of the gear plate causes movement of the sensor through the zones.

In certain embodiments, the sensor may be adapted to identify the windows and solid areas, and to assign a binary code to each of the zones.

In certain embodiments, the sensor may include a plurality of switches each adapted to identify the windows and solid areas.

In certain embodiments, the switches may correspond in number to the sectors defined by the target pattern.

In certain embodiments, the switches may be configured as Hall switches adapted to detect magnetic material, e.g., ferritic material.

In certain embodiments, the sensor may include a first switch, a second switch, and a third switch, and the target pattern may include a first sector, a second sector, and a third sector. In such embodiments, the first switch may be positioned such that rotation of the gear plate causes movement of the first switch through the first sector, the second switch may be positioned such that rotation of the gear plate causes movement of the second switch through the second sector, and the third switch may be positioned such that rotation of the gear plate causes movement of the third switch through the third sector.

In certain embodiments, the first sector may be spaced a first radial distance from the center point of the gear plate, the second sector may be spaced a second radial distance from the center point of the gear plate that is greater than the first distance, and the third sector may be spaced a third radial distance from the center point of the gear plate that is greater than the second distance.

In certain embodiments, the target pattern may include a first zone spanning a first angular distance, a second zone spanning a second angular distance, a third zone spanning a third angular distance, a fourth zone spanning a fourth angular distance, a fifth zone spanning a fifth angular distance, and a sixth zone spanning a sixth angular distance.

In certain embodiments, the windows and solid areas may be arranged such that the sensor assigns a binary code of 0-0-1 to the first zone, a binary code of 0-1-1 to the second zone, a binary code of 0-1-0 to the third zone, a binary code of 1-1-0 to the fourth zone, a binary code of 1-0-0 to the fifth zone, and a binary code of 1-0-1 to the sixth zone.

In certain embodiments, a first position of the gear plate may correspond to a first state in which the low range is being engaged, and a second position corresponds to a third state in which the high range is being engaged. In certain embodiments a third position may correspond to a third state in which the high range is fully engaged and the four-wheel drive mode is being engaged. In certain embodiments, a fourth may correspond to a fourth state in which the high range is fully engaged and the four-wheel drive mode is not engaged. In certain embodiments, another position corresponds to another state in which the high range and the low range are not engaged.

In certain embodiments, the gear plate is rotated to selectively operate the gear reduction mechanism and the secondary torque transfer mechanism.

In another aspect of the present disclosure, an actuation mechanism is disclosed for use in a vehicle transfer case to operate a gear reduction mechanism and a torque transfer mechanism. The actuation mechanism includes a sensor and a gear plate that is rotatable through a plurality of positions. The gear plate includes an integral target pattern that is readable by the sensor to identify the position of the gear plate, as well as states of the gear reduction mechanism and the secondary torque transfer mechanism. The target pattern includes a plurality of windows and a plurality of solid areas collectively defining a plurality of sectors that are spaced radially from a center point of the gear plate and a plurality of zones that are spaced angularly from one another.

In certain embodiments, the gear plate may be rotatable in relation to the sensor such that rotation of the gear plate causes movement of the sensor through the zones.

In certain embodiments, the sensor may be adapted to identify the windows and solid areas, and to assign a binary code to each of the zones.

In certain embodiments, the sensor may include a plurality of switches that are each adapted to identify the windows and solid areas.

In certain embodiments, the switches may correspond in number to the sectors defined by the target pattern.

In certain embodiments, the sensor may include a first switch, a second switch, and a third switch, and the target pattern may include a first sector that is spaced a first radial distance from the center point of the gear plate, a second sector that is spaced a second radial distance from the center point of the gear plate, and a third sector that is spaced a third radial distance from the center point of the gear plate. In such embodiments, the first switch may be positioned such that the rotation of the gear plate causes movement of the first switch through the first sector, the second switch may be positioned such that the rotation of the gear plate causes movement of the second switch through the second sector, and the third switch may be positioned such that the rotation of the gear plate causes movement of the third switch through the third sector.

In certain embodiments, the windows and the solid areas may be arranged such that the sensor assigns a binary code of 0-0-1 to the first zone, a binary code of 0-1-1 to the second zone, a binary code of 0-1-0 to the third zone, a binary code of 1-1-0 to the fourth zone, a binary code of 1-0-0 to the fifth zone, and a binary code of 1-0-1 to the sixth zone.

In another aspect of the present disclosure, a method is disclosed for operating a gear reduction mechanism and a torque transfer mechanism in a vehicle transfer case. The method includes: (i) causing rotation of a gear plate through a plurality of positions such that a target pattern formed integrally with the gear plate passes a sensor that is adapted to read the target pattern and translate the target pattern into a binary code; (ii) interpreting the binary code to identify the position of the gear plate; and (iii) communicating a signal to a control module based on the position of the gear plate to adjust operation of the gear reduction mechanism and the torque transfer mechanism.

BRIEF DESCRIPTION OF THE DRAWINGS

The description herein makes reference to the accompanying drawings, wherein like referenced numerals refer to like parts throughout several views, and wherein.

DETAILED DESCRIPTION

The present disclosure relates to vehicle transfers cases including gear reduction mechanisms and torque transfer mechanisms, and to methods and structures useful in operation of the gear reduction and transfer mechanisms. As discussed in detail herein, the present disclosure describes a rotatable gear plate that includes an integral target pattern readable by a sensor. The sensor interprets the target pattern by detecting the presence and absence of material from the gear plate, and translates the target pattern into a binary code that can be used to identify the specific rotational position of the gear plate. By ascertaining the specific rotational position of the gear plate, accuracy in shift system actuation can be increased.

Figure 1:
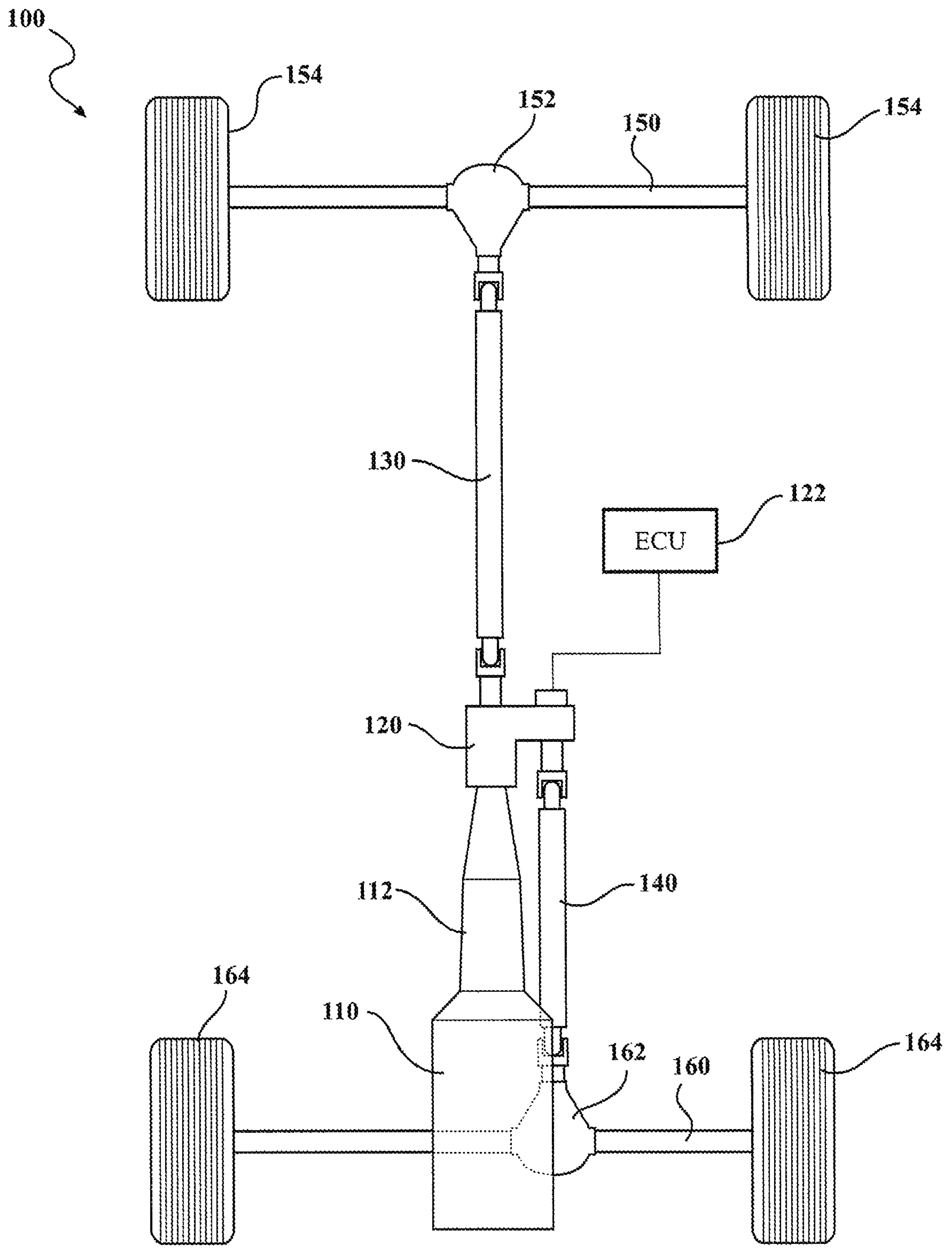
FIG. 1 is a plan view of an exemplary vehicular drivetrain including a transfer case.

With reference now to FIG. 1, a plan view of a drivetrain 100 is provided for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft and the front driveshaft 140 is the secondary driveshaft. In other implementations, the front driveshaft 140 is the primary driveshaft and the rear driveshaft 130 is the secondary driveshaft, and the transfer case 120 performs a mode shift between a front-wheel drive mode and a four-wheel drive mode. In other implementations, the transfer case 120 does not include components that allow a mode shift, and the transfer case 120 constantly provides driving power to both of the rear driveshaft 130 and the front driveshaft 140.

The transfer case 120 can allow a range shift that selectively provides gear reduction to the rotational output of the transfer case 120. For example, the transfer case can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
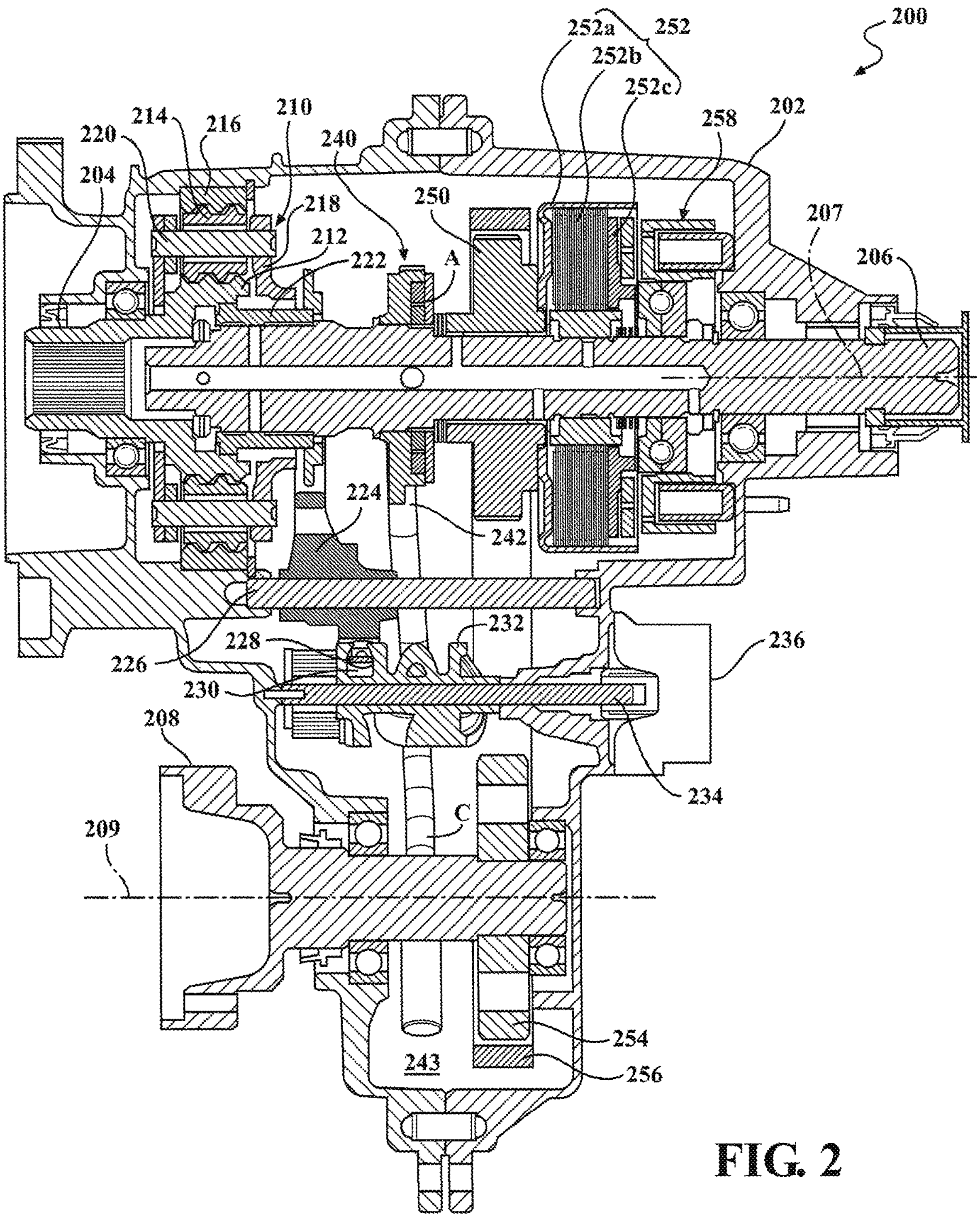
FIG. 2 is a cross-sectional view of the transfer case seen in FIG. 1 illustrating a conventional actuation system.

As shown in FIG. 2, the transfer case 200 generally includes a gear reduction system or mechanism 210 and a secondary torque transfer system or mechanism. The gear reduction system 210 is configured to transfer torque selectively at different drive ratios from an input shaft 204 to a primary output shaft 206 and is operable by a reduction actuation mechanism. The secondary torque transfer system is configured to selectively transfer torque between the primary output shaft 206 (e.g., the rear output shaft) and a secondary output shaft 208 (e.g., the front output shaft) and is operable by a torque transfer actuation mechanism. In the discussion that follows, directional terminology (e.g., front, forward, back, rearward, etc.), though referring to an orientation in which the transfer case may be installed in a vehicle (e.g., in the cross-sections shown in FIGS. 2 and 3, the left side is the front of the transfer case, while the right side is the rear of the transfer case), such directional terminology is for reference only, as other mounting orientations of the transfer cases are possible.

The transfer case 200 includes a housing 202 and rotating components including an input shaft 204, a primary output shaft 206, and a secondary output shaft 208 that each extend out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 (e.g., dog clutch, coupling, ring) is utilized to engage and disengage the gear reduction mechanism 210. In a first position of the gear reduction hub 222, the gear reduction hub 222 is positioned forward axially (i.e., parallel with the primary output shaft 206) to engage the input shaft 204 and the primary output shaft 206 directly, which establishes a 1:1 drive ratio and does not utilize the gear reduction mechanism 210. In a second position of the gear reduction hub 222 (not shown), the gear reduction hub 222 is shifted axially rearward away from the input shaft 204, and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The reduction actuation mechanism moves gear reduction hub 222 between its first and second positions. In particular, the gear reduction hub 222 is moved by a first selector fork 224 which moves forward and rearward axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated be an electric motor 236 in response to control signals from a controller such as the ECU 122 of FIG. 1.

The secondary torque transfer mechanism is configured to transfer torque from the primary output shaft 206 to the secondary output shaft 208. A first sprocket 250 (e.g., rotating member) is arranged on the primary output shaft 206 and connected to the primary output shaft 206 by a plate clutch 252. The second sprocket 254 is arranged on the secondary output shaft 208 and is connected thereto for rotation in unison, such as by splines (not shown). The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged.

The plate clutch 252 generally includes a housing or drum **252*a*, a plurality of interleaved plates 252*b*, a pressure or apply plate 252*c*, and an actuator 258. The housing 252*a* generally includes a radial base through which the primary output shaft 206 extends, and a concentric or annular flange extending axially away from an outer periphery of the base to form a generally cylindrical housing in which the interleaved plates 252*b* are positioned. The base of the housing 252*a* is coupled to the first sprocket 250 to cause rotation thereof, while the apply plate 252*c* is coupled to the primary output shaft 206 (e.g., through a splined connection) to rotate therewith. The interleaved plates 252*b* alternate between being engaged (e.g., splined) with the primary output shaft 206 and an inner periphery of the housing 252*a*. The actuator 258 is configured to press on the apply plate 252*c*, so as to compress the interleaved plates 252*b* between the apply plate 252*c* and the base of the housing 252*a*, so as to increase friction therebetween and transfer torque between the plates 252*b* splined with primary output shaft 206 and the plates 252*b* splined with the housing 252*a*. In this manner, torque may be selectively transferred from the primary output shaft 206 to the first sprocket 250 and ultimately the secondary output shaft 208**.

Figure 3:
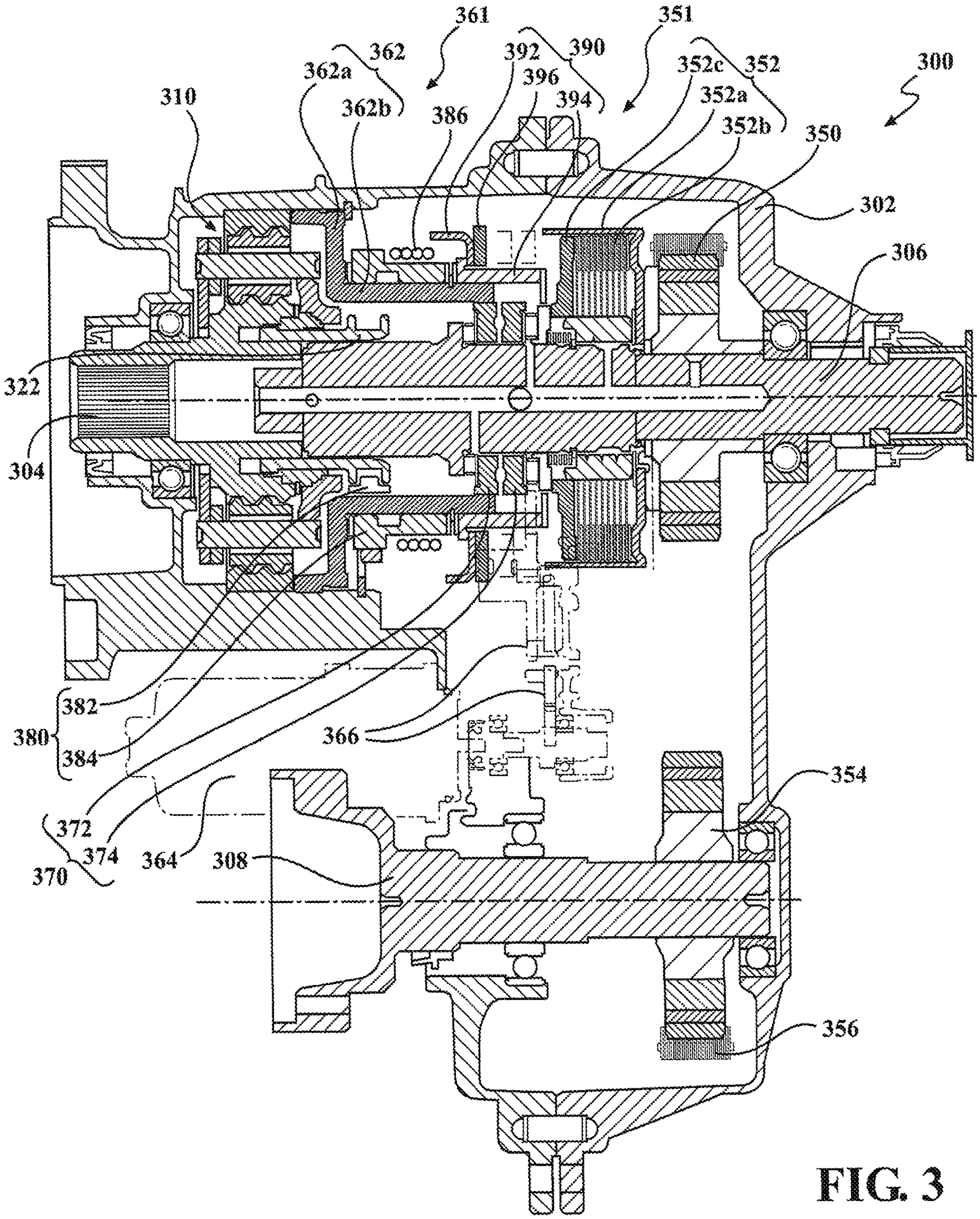
FIG. 3 is a cross-sectional view of the transfer case seen in FIG. 1 including an actuation system according to one embodiment of the present disclosure.
Figure 4:
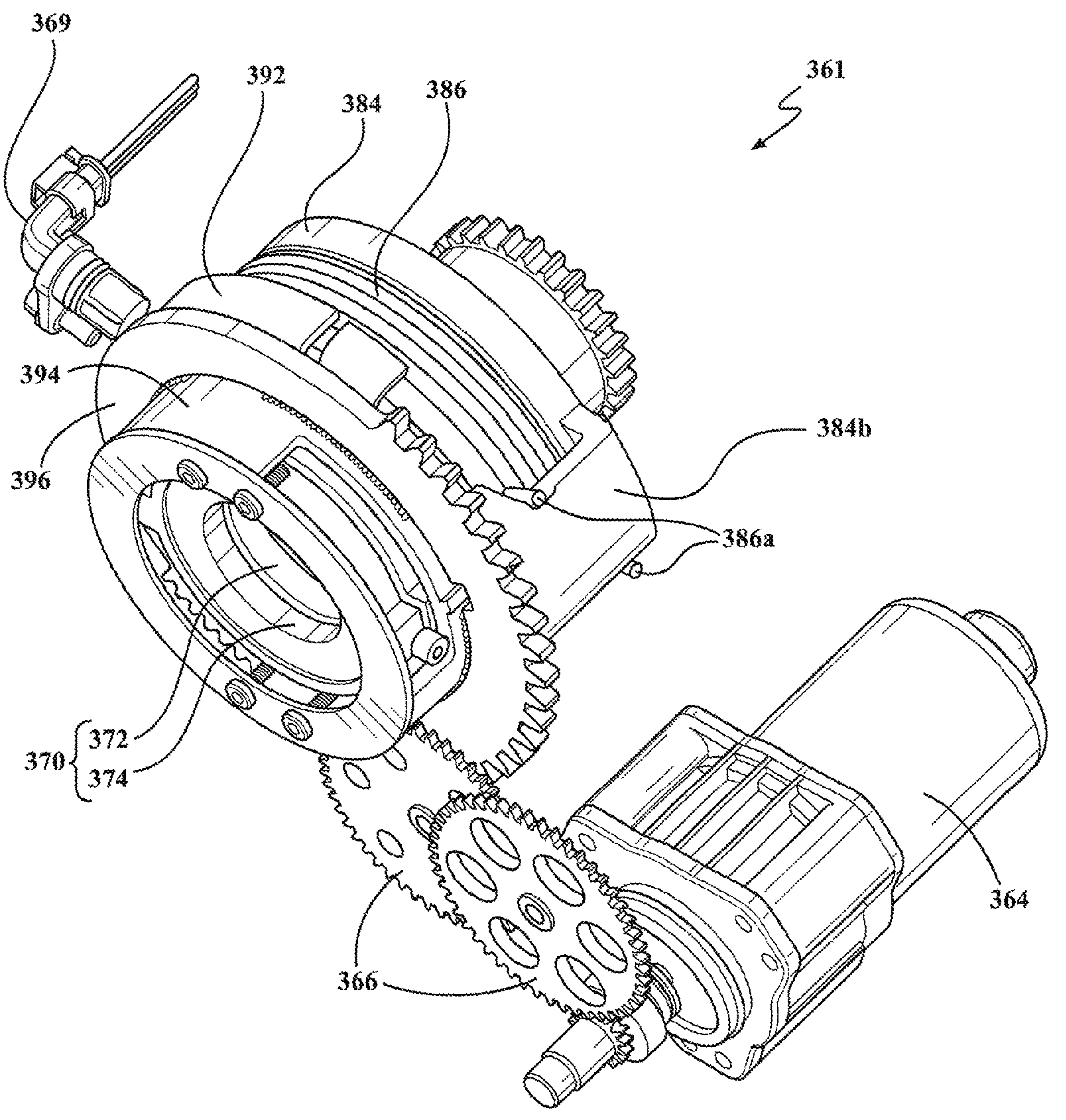
FIG. 4 is a rear, perspective view of the actuation system seen in FIG. 3.
Figure 5:
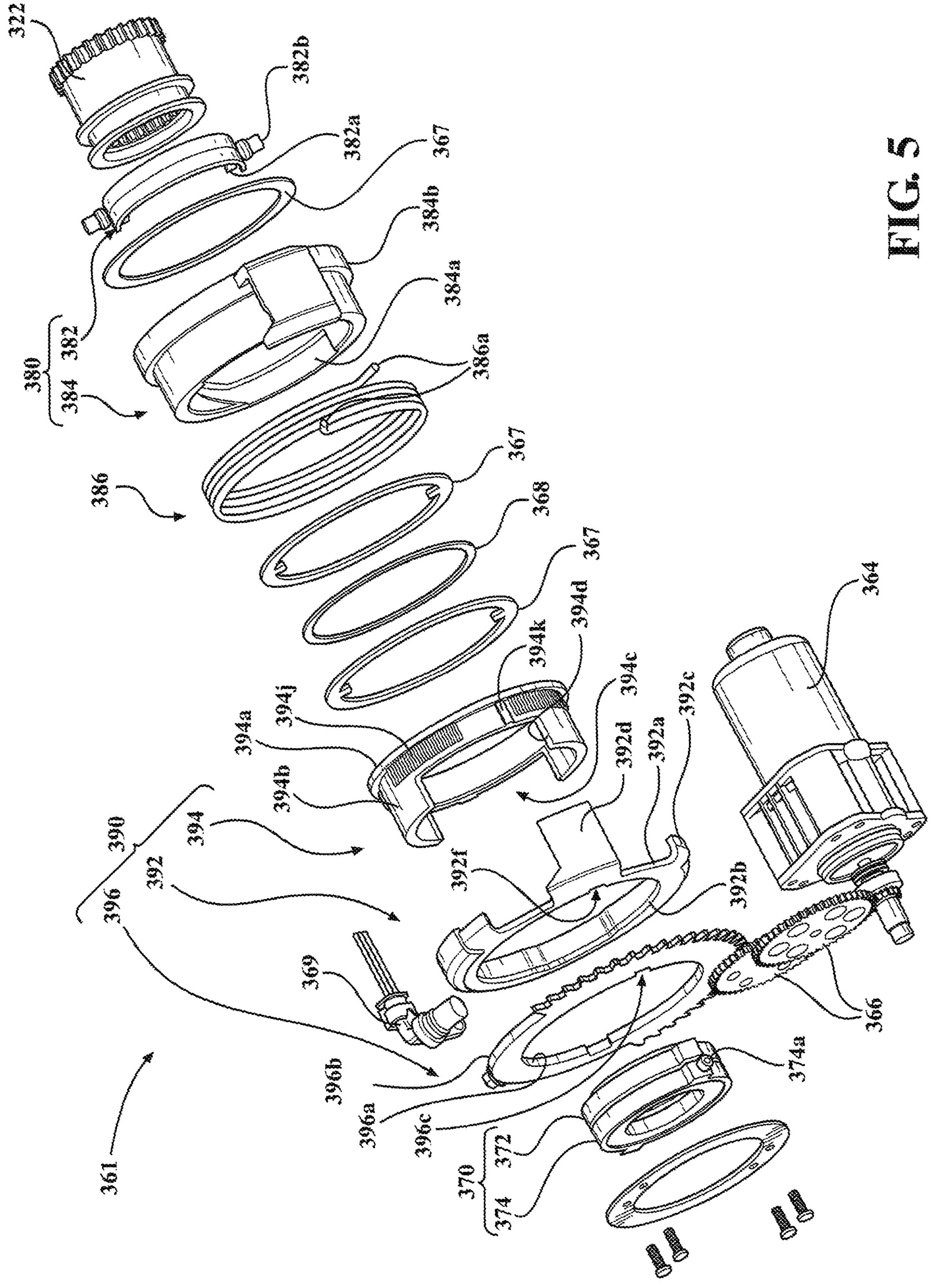
FIG. 5 is an exploded view of the actuation system seen in FIG. 3.

FIG. 3 is a cross-sectional illustration showing the transfer case 300, while FIGS. 4-5 depict an actuation system 361 of the transfer case 300 in isolation. The transfer case 300 generally includes a gear reduction mechanism 310 (i.e., having a planetary gear set) and a secondary torque transfer mechanism 351 (i.e., having a first sprocket 350, plate clutch 352, second sprocket 354 coupled to a secondary output shaft 308, and chain 356), which include similar components and functionality of the gear reduction mechanism 210 and secondary torque transfer mechanism discussed previously (not all components labeled individually). The transfer case 300 also includes an actuation system or mechanism 361 that functions to operate both the gear reduction mechanism 310 and the secondary torque transfer mechanism 351. Components and assemblies of the transfer case 300 having generally the same and/or similar function as those of the transfer case 200 are generally described with common naming and numbering increasing by 100 (e.g., gear reduction mechanism 210 and gear reduction mechanism 310) across different embodiments.

As compared to the transfer case 200, the orientation of the plate clutch 352 and sprocket 350 of the secondary torque transfer mechanism 351 are reversed front to rear with the plate clutch 352 having its apply plate 352*c* facing forward, and the plate clutch 352 itself being disposed forward of the sprocket 350. The actuation system 361 is generally positioned axially between the gear reduction mechanism 310 and the plate clutch 352. The actuation system 361 engages the reduction hub 322 to operate the gear reduction mechanism 310, and is further configured to engage the apply plate 352*c* of the plate clutch 352 to operate the secondary torque transfer mechanism 351.

As shown in FIGS. 4-5, the actuation system 361 generally includes an actuator base 362, a motor 364 with reduction gears 366, a secondary torque transfer actuator mechanism 370 (e.g., plate clutch actuator, first actuator mechanism), a gear reduction actuator mechanism 380 (e.g., dog clutch actuator, second actuator mechanism), and a drive gear assembly 390 (e.g., drive assembly). Generally speaking, the motor 364, by way of the reduction gears 366, rotates the drive gear assembly 390, which, in turn, causes sequential (i.e., serial, staged) operation of the gear reduction actuator mechanism 380 and the torque transfer actuator mechanism 370, each stage of rotation generally being associated with one of the actuator mechanisms 370, 380. For example, a first stage is associated with the gear reduction actuator mechanism 380. In the first stage (e.g., first or initial range of motion or rotation; first positive stage and first negative stage), the drive gear assembly 390 is rotated (e.g., +/− between 30 and 50 degrees from center, such as 35 degrees) by the motor 364 via the reduction gears 366 to operate the gear reduction actuator mechanism 380, which moves the gear reduction hub or coupling 322 into the first position (e.g., high range at +35 degrees) or the second position (e.g., low range at −35 degrees). In a second stage (e.g., second, continued, or subsequent range of motion or rotation from ends of the first stage; second positive stage, and second negative stage), the drive gear assembly 390 is further rotated (e.g., +/− an additional 10-30 degrees, such as 25 degrees, meaning+35 degrees to +60 degrees and −35 degrees to −60 degrees) by the motor 364 to operate the secondary torque transfer actuator mechanism 370, which presses the clutch apply plate 352*c* to compress the interleaved plates 352*b* within the clutch housing 352*a*. As discussed in further detail below, the torque transfer actuator mechanism 370 and gear reduction actuator mechanism 380 each include cam mechanisms, which include advance and/or retreat movement regions and/or dwell regions that, in conjunction with the drive gear assembly 390, provided for the staged operation.

According to other exemplary embodiments, the various stages of operation of the actuator system 361 may be configured differently, for example, with different ranges of motion in the first and/or second stage (i.e., greater or lesser), different bidirectional ranges for each direction of motion within a given stage (e.g., +35 degrees in the first positive stage, and −25 degrees in the first negative stage), overlapping ranges of motion between stages (e.g., +/−35 degrees in the first stage, and +30 to +60 and −30 to −60 in the second positive and negative stages), with gaps between the ranges of motion (e.g., +/−30 degrees in the first stage, and +35 to +60 and −35 to −60 in the second positive and negative stages), with additional stages (e.g., to operate other actuator mechanisms), and/or with unidirectional stages associated with one or more of the actuator mechanisms (e.g., rotation in only one direction causes the actuator mechanism to operate).

The actuator base 362 is a generally rigid, stationary member that fixedly couples the actuation system or actuator 361 to the housing 302 of the transfer case 300. The actuator base 362 generally includes a base portion 362*a* (e.g., a forward or radially outer portion), which couples to the housing 302 of the transfer case 300 proximate the gear reduction mechanism 310, for example, with a thrust washer, an interference fit, and/or other fasteners. The actuator base 362 also includes a generally cylindrical body or body portion 362*b* (e.g., a radially inner or annular portion or stem), which extends rearward axially away from the base portion 362*a* toward the plate clutch 352. The actuator base 362 includes a central bore (not labeled) through which the primary output shaft 306 extends. Other components of the actuation system 361 are fixedly or movably coupled to the body portion 362*b* as discussed below.

The motor 364, by way of the reduction gears 366, is configured to rotate the drive gear assembly 390 about the actuator base 362, which in turn causes the secondary torque transfer actuator mechanism 370 to operate the plate clutch 352 and causes the gear reduction actuator mechanism 380 to move the gear reduction hub 322. The motor 364 is fixedly coupled to, and the reduction gears 366 are rotatably coupled to the housing 302 at positions located radially outward of the primary output shaft 306.

The gear reduction actuator mechanism 380 functions as a cylindrical or barrel cam mechanism, which moves the gear reduction hub 322 between the first and second positions during the first stage (e.g., initial rotation of the drive gear assembly 390 from a center). The gear reduction actuator mechanism 380 includes a shift fork 382 and a barrel 384 (e.g., shift cam). With rotation, the barrel 384 is configured to displace the shift fork 382 forward and rearward axially within the transfer case 300, so as to move the gear reduction hub 322 between the first or forward position (i.e., in which the gear reduction hub 322 directly couples input shaft 304 and the primary output shaft 306; establishing the high range) and the second or rearward position (i.e., in which the gear reduction hub 322 couples the input shaft 304 and the primary output shaft 306 by way of the gear reduction mechanism 310; establishing the low range).

The shift fork 382 is a generally arcuate member positioned substantially within the central bore of the body portion 362*b* of the actuator base 362 and radially outward of the primary output shaft 306. The shift fork 382 is generally semicircular having an inner flange 382*a* that extends radially inward from an inner peripheral surface of the shift fork 382. The inner flange 382*a* is positioned between and engages radially outwardly extending, peripheral flanges of the gear reduction hub 322, such that axial movement of the shift fork 382 moves the gear reduction hub 322 axially between the first and second positions.

The shift fork 382 also includes two followers **382*b* configured as rollers, each extending radially outward from the outer peripheral surface of the shift fork 382 through an axially extending slot (not shown) in the body portion 362*b* of the actuator base 362 to be engaged by the barrel 384 (discussed below). The axially extending slot of the body portion 362*b* of the base maintains the shift fork 382 in a constant rotational position relative to the actuator base 362, while allowing the shift fork 382 to translate axially. The two followers 382*b* are positioned substantially opposite each other (i.e., approximately 180 degrees apart) at, or proximate to, ends of the shift fork 382. Each follower 382*b* is coupled to and rotates about an axle, which extends substantially radially outward from ends of the shift fork 382 (e.g., perpendicular to the outer peripheral surface). The shift fork 382 may additionally include a boss or protrusion for each follower 382*b*** extending radially outward from the outer peripheral surface to which the axle is coupled.

The barrel 384 is a generally cylindrical member that surrounds the body portion **362*b* of the actuator base 362 and is configured to rotate thereabout to, thereby, axially move the shift fork 382. The barrel 384 includes an inner peripheral surface that bears against an outer peripheral surface of the body portion 362*b* of the actuator base 362. One or more thrust washers 367 and/or snap clips 368 are coupled to the outer periphery of the body portion 362*b* at an intermediate axial location thereof, as well as adjacent the base portion 362*a*. As the barrel 384 rotates about the body portion 362*b* of the base, edges of the barrel 384 may slide and bear against the thrust washers 367 to transfer an axial force for moving the gear reduction hub 322 relative to the actuator base 362** forward and rearward.

The barrel 384 includes an inner cam slot **384*a* configured to engage and axially move the shift fork 382 and, thereby, move the gear reduction hub 322 between the first and second positions. Each cam slot 384*a* extends radially outward from the inner peripheral surface with one of the followers 382*b* of the shift fork 382 being positioned in each slot 384*a*. Each cam slot 384*a* includes a movement region having opposed helically ramped surfaces that engage the follower 382*b* during the first movement stage (i.e., initial rotation of the barrel 384 and drive gear assembly 390 from center) to move the shift fork 382 axially forward and rearward. The movement region is flanked by dwell or flat regions in which the slot 384*a* maintains the follower 382*b*** in a generally fixed axial position in the second movement stage (e.g., continued positive and negative rotation from respective ends of the first positive stage and the first negative stage) and any subsequent movement.

In order to rotate the barrel 384, the barrel 384 includes an outer radial flange or member **384*b*, which is positioned radially outward of an outer peripheral surface of the barrel 384 and extends axially rearward from a forward end of the barrel 384. The outer radial member 384*b* is engaged by a torsion spring 386, which transfers torque from the drive gear assembly 390 to rotate the barrel 384. More particularly, the torsion spring 386 is positioned between the outer peripheral surface of the barrel 384 and the outer radial member 384*b* and is wound about and bears against the outer peripheral surface of the barrel 384. The torsion spring 386 includes two ends 386*a* that extend radially outward to engage an axially-extending edges of the outer radial member 384*b* and to engage the drive gear assembly 390 to transfer torque therebetween. In the case of a blocked shift event (i.e., when splines of the reduction hub 322 engage ends of splines of the input shaft 304 or planet carrier [not shown, refer to the gear reduction mechanism 210 above] of the gear reduction mechanism 310), the torsion spring 386 allows for relative rotational motion between the barrel 384 and the drive gear assembly 390, while storing energy that causes axial movement of the reduction hub 322 once properly aligned with the input shaft or gear reduction mechanism 310**.

The secondary torque transfer actuator mechanism 370 functions as a face cam mechanism (e.g., is a face cam mechanism, such as a ball ramp mechanism) to convert continued rotation of the drive gear assembly 390 into axial movement for operating the plate clutch 352 within the second stage of rotational movement (e.g., continued rotation from approximate ends of the first stage). The secondary torque transfer actuator mechanism 370 includes a forward member 372 (e.g., first plate, ring, or cam member) and a rearward member 374 (e.g., second plate, ring, or cam member), which are configured for relative rotation therebetween and resultant relative axial displacement for engaging the plate clutch 352. Both the forward member 372 and the rearward member 374 include central apertures or bores through which the primary output shaft 306 extends. The forward member 372 is coupled to a rearward end of the body portion **362*b* of the actuator base 362, while the rearward member 374 is configured to both rotate and move axially relative to the forward member 372 and, thereby, move the actuator base 362. For example, as shown, the forward member 372 is positioned within the central bore extending through the body portion 362*b* of the actuator base 362 and may be coupled thereto by a press-fit, interference fit, or splined connection. The forward member 372 is positioned against a bearing member coupled to the output shaft 306 to prevent forward axial movement thereof. The rearward member 374 is configured to be rotated by the drive gear assembly 390 relative to the forward member 372, as discussed in further detail below, and is positioned to press the apply plate 352*c* via an intermediate bearing. The intermediate bearing allows the apply plate 352*c* to spin with the output shaft 306 independent of the rearward member 374**, which rotates back and forth within a limited range of motion of the second stage.

At least one of the forward member 372 or rearward member 374 includes an inner surface (i.e., facing the other plate; not shown) that includes two movement advance regions that are helically ramped in opposite directions. Each of a plurality of followers or rollers (e.g., balls) bear against the inner surfaces of both members 372, 374, such that rotation of the rearward member 374 from a center causes the rearward member 374 to displace rearward axially to engage the apply plate **352*c* of the plate clutch and, thereby, operate the secondary torque transfer mechanism 351. As discussed below, the drive gear assembly 390 is configured to not engage the followers 374*a* during the first movement stage (e.g., initial rotation of the drive gear assembly 390 from center), so as to not operate the secondary torque transfer actuator mechanism 370. However, the forward and rearward members 372, 374 may instead or additionally include dwell regions for the first movement stage in which rotation does not cause axial movement of the rearward member 374** and/or any subsequent movement stage.

In order to rotate the rearward member 374 relative to the forward member 372, the rearward member 374 is configured to receive application of one or more tangential forces from the drive gear assembly 390 (discussed in further detail below). The rearward member 374 includes one or more followers **374*a* configured as rollers extending radially outward from a periphery of the rearward member 374. For example, the rearward member 374 may include two followers 374***a* that are positioned substantially opposite each other (i.e., approximately 180 degrees apart). Each follower 374*a* is coupled to and rotates about an axle, which extends radially from the periphery of the rearward member 374 (e.g., perpendicular to an outer surface thereof). The rearward member 374 may additionally include a boss or protrusion for each follower 374*a* extending radially outward from the periphery of the rearward member 374 to which the axle and follower 374*a* are coupled.

As mentioned previously, the drive gear assembly 390 is configured to be rotated by the motor 364 via the reduction gears 366 in order to operate the secondary torque transfer actuator mechanism 370 and the gear reduction actuator mechanism 380. The drive gear assembly 390 generally includes a sense plate 392 (e.g., a first plate), hub 394 (e.g., actuator member), and gear plate 396 (e.g., a second plate), which are fixedly coupled to each other to be rotated in unison by the motor 364. When the motor 364 drives the gear plate 396 by way of the reduction gears 366, the hub 394 engages the followers 374*a* to operate the secondary torque transfer actuator mechanism 370, and the sense plate 392 engages the torsion spring 386 to operate the gear reduction actuator mechanism 380. The drive gear assembly 390 is positioned about the actuator base 362 with an inner peripheral surface of the hub 394 bearing on the outer peripheral surface of the body portion 362*b* of the actuator base 362. The drive gear assembly 390 is held axially on the actuator base 362 between one of the thrust washers 367 and an end plate coupled to the body portion 362*b* of the base 362. While the drive gear assembly 390 may alternatively be provided as a single component or two primary components, an assembly of the sense plate 392, hub 394, and gear plate 396 may provide for less complicated manufacturing, while allowing each component to be configured individually (e.g., to optimize material type according to strength, weight, and cost considerations).

The gear plate 396 is configured to receive an input torque from the motor 364 via the reduction gears 366 through a first movement stage, second movement stage, and any subsequent movement stages of the drive gear assembly 390. The gear plate 396 is a unitary, generally planar member having a central bore or aperture defined by an inner periphery 396*a* and an outer periphery 396*b*. The primary output shaft 306, along with other components of the actuator 361, extends through the central aperture. The outer periphery 396*b* includes a plurality of teeth that mesh with mating teeth of the reduction gears 366, so as to be rotated by the motor 364. Because the actuator 361 operates within a limited range of rotational motion in the first and second movement stages (e.g., +/−60 degrees), as described above for operating both the secondary torque transfer actuator mechanism 370 and the gear reduction actuator mechanism 380, only a portion of the outer periphery 396*b* (e.g., 180 degrees) may include teeth. The gear plate 396 may, for example, be made from powdered metal steel and, as discussed in further detail below, may include various features to facilitate coupling to the sense plate 392 and/or hub 394.

The sense plate 392 is configured to be driven by the gear plate 396 for operating the gear reduction actuator mechanism 380. The sense plate 392 may also be configured with a position sensor 369 for monitoring the rotational position of the actuator 361. The sense plate 392 is a unitary member, which generally includes a planar portion 392*a* with a central bore or aperture defined by an inner periphery 392*b*, and also includes first and second annular flanges 392*c*, 392*d*, which extend forward axially from an outer periphery of the planar portion 392*a*. In the drive gear assembly 390, the planar portion 392*a* is positioned forward of and adjacent to a forward surface of the gear plate 396. The first flange 392*c* extends substantially circumferentially (e.g., approximately 270 degrees) about the outer periphery of the planar portion 392*a*. The second flange 392*d* is configured relative to the outer radial member 384*b* of the barrel 384 to transfer torque therebetween via the torsion spring 386. More particularly, the second flange 392*d* is positioned between the circumferential ends of the first flange 392*c* and has a width that is complementary to the width of the outer radial member 384*b* of the barrel 384, such that both the outer radial member 384*b* of the barrel cam 384 and the second flange 392*d* of the sense plate 392 are positioned between and engaged by the ends 386*a* of the torsion spring 386. The second flange 392*d* is additionally, positioned radially between the coil of the torsion spring 386 and the outer radial member 384*b* of the barrel cam 384. The sense plate 392 may, for example, be made from stamped steel, and as discussed in further detail below, may include various features to facilitate coupling to the hub 394 and/or gear plate 396.

The hub 394 is configured to be driven by the gear plate 396 to operate the secondary torque transfer actuator mechanism 370, for example, in limited ranges of motion of the drive gear assembly 390. During the first movement stage (e.g., initial rotation from center in which the secondary torque transfer actuator mechanism 370 moves the gear reduction hub 322, as discussed previously), the hub 394 rotates freely of the secondary torque transfer actuator mechanism 370, so as to not engage the plate clutch 352. During continued rotation in the second movement stage (e.g., continued positive and negative rotation from respective ends of the first stage), the hub 394 engages the secondary torque transfer actuator mechanism 370. The hub 394, for example, rotates about a common axis with the rearward member 374 (e.g., the axis of the primary output shaft 306).

The hub 394 is a unitary member, which generally includes a base portion 394*a* (e.g., radial flange) with a central aperture, and includes an annular body 394*b* extending axially from an inner periphery of the base portion 394*a*, which rotates about and bears against the body portion 362*b* of the actuator base 362. As part of the drive gear assembly 390, the annular body 394*b* extends rearward through the central apertures of the sense plate 392 and gear plate 396 with the sense plate 392 being held between the base portion 394*a* of the hub 394 and the gear plate 396. The hub 394 may, for example, be made from powdered metal steel and, as discussed in further detail below, may include various features to facilitate coupling to the sense plate 392 and/or gear plate 396.

The sense plate 392, hub 394, and gear plate 396 are fixedly coupled together to form the drive gear assembly 390 and to rotate in unison as a single unit. According to the embodiment shown in FIGS. 3-5, the sense plate 392, hub 394, and gear plate 396 are coupled together via a press-fit, splined arrangement. More particularly, the annular body 394*b* (e.g., inner peripheral flange) of the hub 394 is configured to be inserted into the central bore of the sense plate 392 and the central bore of the gear plate 396. The diameter of the outer surface of the annular body 394*b* of the hub 394 nominally has an outer diameter that is slightly smaller than the inner diameters of the inner peripheries 392*b* and 396*a* of the sense plate 392 and gear plate 396, respectively. The annular body 394*b* includes a plurality of coupling splines 394*j* extending axially and protruding radially outwardly from the outer surface in one or more regions to tightly engage and couple to the inner peripheries 392*b* and 396*a* of the sense plate 392 and gear plate 396. The coupling splines 394*j* may, for example, be configured to deform or cut material forming the inner peripheries 392*b* and 396*a* as the sense plate 392 and gear plate 396 are pressed successively onto the annular body 394*b* of the hub 394. The annular body 394*b* may additionally include one or more alignment splines 394*k* extending axially and protruding radially outwardly from the outer surface at one or more locations to be received within alignment slots 392*f* and 396*c* of the sense plate 392 and gear plate 396, respectively. During operation, the motor 364 by way of the reduction gears 366 engages and rotates the gear plate 396, which transfers torque to the hub 394 by way of the splined connection, which in turn transfers torque to the sense plate 392 by way of the splined connection.

Figure 6B:
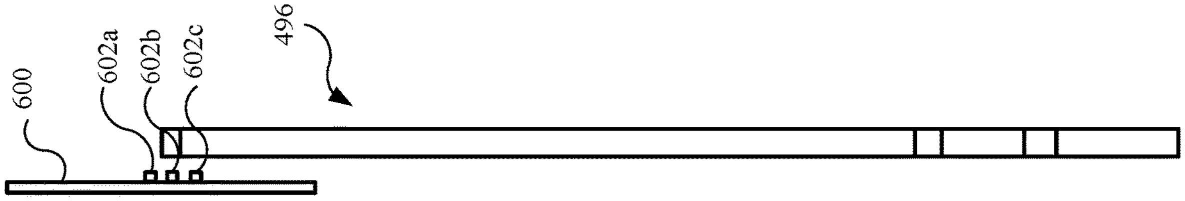
FIG. 6B is a side view of the gear plate with a sensor in proximity thereto.

The hub 394 additionally defines slots or cutouts 394*c* (e.g., two slots) in the annular body 394*b* in which the followers 374*a* of the secondary torque transfer actuator mechanism 370 are positioned (see, e.g., FIG. 6). Each slot 394*c* is defined between two end walls or tracks 394*d* (e.g., circumferentially opposed end walls) of the annular body 394*b*, which extend axially rearward. The slots 394*c* are sized equally and are circumferentially spaced according to spacing of the followers 374*a* to provide simultaneous engagement of the followers 374*a* during rotation of the drive gear assembly 390. During the first movement stage, the followers 374*a* each remain in a middle region of the slot 394*c* between the opposed end walls 394*d*. With continued rotation in the second movement stage, each of two end walls 394*d*, one from each slot 394*c*, simultaneously engage and apply a tangential force to one of the followers 374*a* to rotate the rearward member 374 of the secondary torque transfer actuator mechanism 370. With this rotation, the rearward member 374 displaces axially rearward from the forward member 372 (i.e., so as to compress the plate clutch 352), while the followers 374*a* roll rearward along the opposed end walls 394*d*. The end walls 394*d* have an axial length allowing the followers 374*a* to travel thereon through the full range of axial displacement of the secondary torque transfer actuator mechanism 370.

As force is applied to the end walls 394*d* by the followers 374*a*, localized contact stress (e.g., Hertzian stress) develops on a flat surface of the end wall 394*d* at the interface with the curved surface of the follower 374*a*. Depending on the peak output of the actuator 361 (e.g., torque applied by the motor 364 by way of the reduction gears 366 and gear plate 396) the material properties of the hub 394, this localized peak contact stress may cause yielding or fatigue of the hub 394 in the region of the end walls 394*d*, for example, during blocked shift conditions. According to one exemplary embodiment, the entire hub 394 is made from a single material (e.g., powdered metal steel), which provides sufficient strength to prevent yielding from expected peak localized contact stress of the end walls 394*d* and to prevent fatigue from repeated loading of the end walls 394*d*. For example, the yield strength may be greater than approximately 1.5 to 2.0 times the peak expected contact stress.

With reference now to FIGS. 6A-12, an alternate embodiment of the aforedescribed gear plate 396 (e.g., drive gear) will be discussed, which is identified by the reference character 496. The gear plate 496 is identical to the gear plate 396 but for the distinguishing features and elements discussed herein below. Accordingly, in the interest of brevity, the gear plate 496 will only be discussed to the extent necessary to describe the features and elements distinguishing the gear plate 496 from the gear plate 396.

The gear plate 496 is configured and dimensioned for use with a sensor 600, and includes a target pattern 500 that can be interpreted by the sensor 600 to ascertain the precise rotational position of the gear plate 496 to increase the accuracy of shift system actuation. More specifically, the target pattern 500 includes one or more windows 502 (i.e., areas lacking material) configured as openings or reliefs in the gear plate 496 that are separated by one or more solid areas 504 (i.e., areas having material). The particular arrangement of the windows 502 and the solid areas 504 represents a unique Gray code that can be read by the sensor 600 as a binary signature and translated into a signal including information pertaining to the rotational position of the gear plate 496 and shift system state change(s), as discussed in further detail below. It is envisioned that the target pattern 500 may be integrated into the gear plate 496 through any suitable method, such as, for example, by a metal forming die, machining, laser cutting, etc.

The integration of Gray code logic into the gear plate 496 eliminates certain challenges and obstacles associated with other methods of detecting the rotational position of the gear plate 496. For example, linear hall sensors may be prone to metallic debris build-up, and mechanical follower-style sensors may be susceptible to physical wear, thus degrading accuracy over time. Moreover, when compared to mechanical follower-style sensors, the presently disclosed gear plate 496 reduces design complexity by eliminating additional components and/or fastening points, allows for reduced manufacturing tolerances, thus potentially resulting in a reduction in overall costs.

Figure 6A:
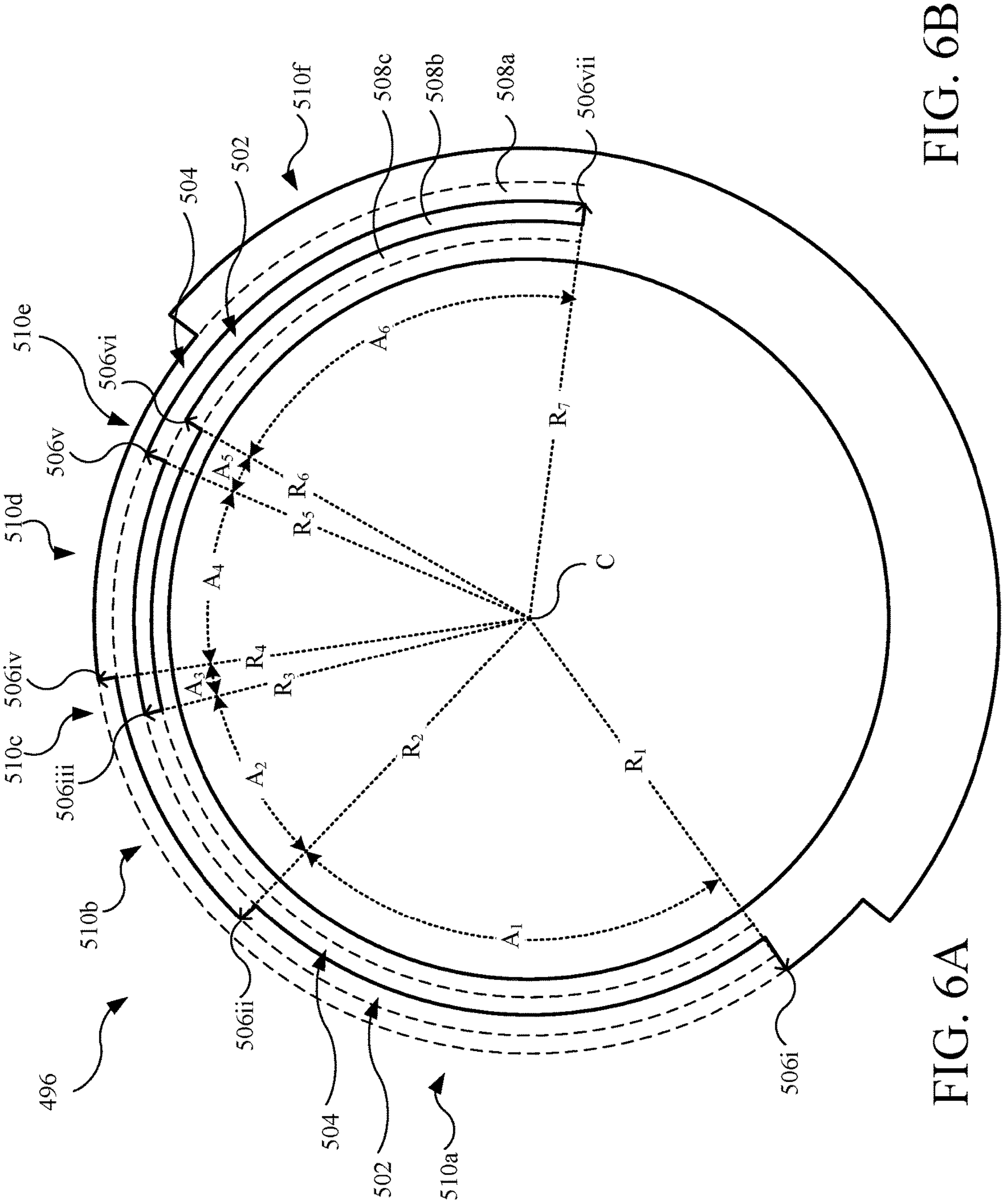
FIG. 6A is a front view of an alternate embodiment of a gear plate for use in the actuation system seen in FIG. 3.

With reference to FIG. 6A—in particular, the windows 502 and solid areas 504 define reference points 506 that are positioned at different radial and angular positions on the gear plate 496 so as to define sectors 508 and zones 510. For clarity, in the illustrations provided, the gear teeth included on the gear plate 496 have been removed. Each of the sectors 508 is spaced a different radial distance R from a center point C of the gear plate 496, and the zones 510 are separated from one another by angular distances A. That is, each sector 508 spans a radial region, while each zone 510 spans a circumferential or angular region that overlaps the sectors 508. The reference points 506, as described herein, are positioned at the radially outer edge of each sector 508, such that the sector 508 corresponding thereto extends radially inward thereof. In the particular embodiment of the gear plate 496 seen in FIGS. 6A-12, the target pattern 500 includes seven reference points 506*i*-506*vii* defining three sectors 508*a*, 508*b*, 508*c* and six zones 510*a*-510*f*. Zone 510*a* (FIGS. 6, 8) is located between reference points 506*i*, 506*ii*, zone 510*b* is located between reference points 506*ii*, 506*iii*, zone 510*c* is located between reference points 506*iii*, 506*iv*, zone 510*d* is located between reference points 506*iv*, 506*v*, zone 510*e* is located between reference points 506*v*, 506*vi*, and zone 510*f* is located between reference points 506*vi*, 506*vii*.

In alternate embodiments of the present disclosure, dependent, for example, upon the intended use of the gear plate 496 and/or desired result, it should be appreciated that the number of windows 502, solid areas, 504, reference points 506, sectors 508, and/or zones 510 may be varied. For example, it is envisioned that the gear plate 496 may include a single window 502 and/or a single solid area 504, greater or fewer reference points 506, greater or fewer sectors 508, greater or fewer zones 510, etc.

With continued reference to FIGS. 6A-12, the reference point 506*i* is spaced a radial distance R1 from the center point C of the gear plate 496, the reference point 506*ii* is spaced a radial distance R2 from the center point C, the reference point 506*iii* is spaced a radial distance R3 from the center point C, the reference point 506*iv* is spaced a radial distance R4 from the center point C, the reference point 506*v* is spaced a radial distance R5 from the center point C, the reference point 506*vi* is spaced a radial distance R6 from the center point C, and the reference point 506*vii* is spaced a radial distance R7 from the center point C. Additionally, the reference point 506*i* is spaced an angular distance A1 from the reference point 506*ii*, the reference point 506*ii* is spaced an angular distance A2 from the reference point 506*iii*, the reference point 506*iii* is spaced an angular distance A3 from the reference point 506*iv*, the reference point 506*iv* is spaced an angular distance A4 from the reference point 506*v*, the reference point 506*v* is spaced an angular distance A5 from the reference point 506*vi*, and the reference point 506*vi* is spaced an angular distance A6 from the reference point 506*vii*. A difference in the radial distances forms the sectors 508, while the angular distances form the zones 510.

In the particular embodiment seen in FIGS. 6A-12, for example, the reference points 506*i*-506*vii* are positioned such that the radial distances R1, R4 both measure 71.98 mm, the radial distances R2, R5, and R7 each measure 75.93 mm, and the radial distances R3, R6 both measure 79.83 mm, and the angular distances A1-A6 are 72.3°, 37.1°, 3°, 36.8°, 5°, and 68.9°, respectively. It should be appreciated, however, that the locations of the reference points 506*i*-506*vii*, and thus, the distances A1-A6, R1-R7, may be altered in various embodiments of the present disclosure to achieve any desired values for the distances R1-R7 and/or the distances A1-A6.

The sensor 600 may be secured to any surface suitable for the intended purpose of permitting rotation of the gear plate 496 in relation to the sensor 600 in the manner discussed herein. For example, the sensor 600 may be fixedly coupled to an inner surface of the housing 302 of the transfer case 300, or other stationary structure.

The sensor 600 is adapted and programmed to detect the presence and absence of material in the target pattern 500, e.g., magnetic material, such as ferritic material, for example. The sensor 600 interprets the target pattern 500 based on the presence and absence of material detected and outputs a corresponding binary code that is subsequently transmitted to a controller, such as the ECU 122 (FIG. 1), for example, to control or modify operation of the transfer case 300 based on the position of the gear plate 496 in order to increase the accuracy of system shift positions. To facilitate interpretation of the target pattern 500, the sensor 600 includes one or more switches 602 that correspond in number to the sectors 508. As such, in the embodiment of the sensor 600 seen in FIGS. 6A-12, the sensor 600 includes three switches 602*a*, 602*b*, 602*c* to read and interpret the presence or absence of material in sectors 508*a*, 508*b*, 508*c*, respectively. Although illustrated as including three sectors 508 and three switches 602 in the particular embodiment illustrated in FIGS. 6A-12, in alternate embodiments, the number of sectors 508 and switches 602 may be varied without departing from the scope of the present disclosure.

In certain embodiments, such as that illustrated in FIGS. 6A-12, it is envisioned that the switches 602 included on the sensor 600 may be configured as an array of Hall switches that react to an electromagnetic force cooperatively generated by the sensor 600 and the material of the gear plate 496. Given their wide availability, Hall switches may be utilized to reduce costs, and may be less sensitive to mechanical stack variation, temperature drift, and target design complexity than other available switches. For example, the switches 602 may include integral magnets, such as being back bias hall switches with integral magnets. The switches 602 may be connected to a circuit board or other structure to be held in fixed relationship to each other (i.e., corresponding to radial spacing of the sectors 508). The sensor 600 may be considered a hall switch array.

As the gear plate 496 rotates in relation to the sensor 600, the switches 602 included on the sensor 600 read and interpret the target pattern 500. For example, in the embodiment illustrated in FIGS. 6A-12, the switches 602 are adapted and programmed to interpret the presence of material as a "1" and the absence of material as a "0" such that 1-bit changes are read as zones 510*a*-510*f* pass by the sensor 600 during rotation of the gear plate 496. By configuring and dimensioning the gear plate 496 for 1-bit changes between zones 510, it is envisioned that transition errors between zones 510 can be minimized, if any. For example, moving from one of the zones 510*a*-510*f* to an adjacent one of the zones 510*a*-510*f*, the presence of material changes in only one sector, such that the reading of only one of the switches 602 changes at a time.

Figure 7:
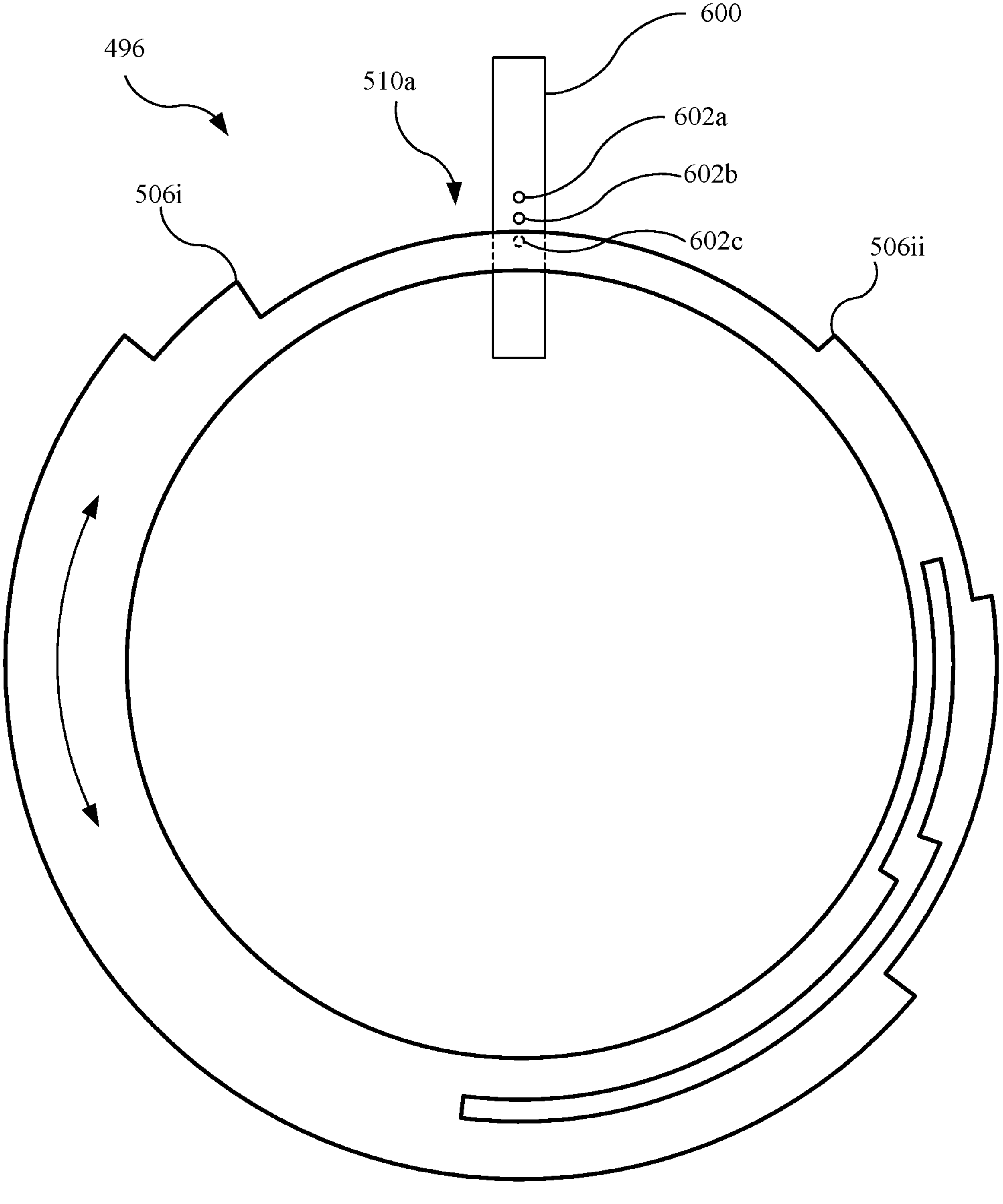
FIG. 7 is a front view of the gear plate seen in FIG. 6A shown in a first angular position relative to the sensor.
Figure 8:
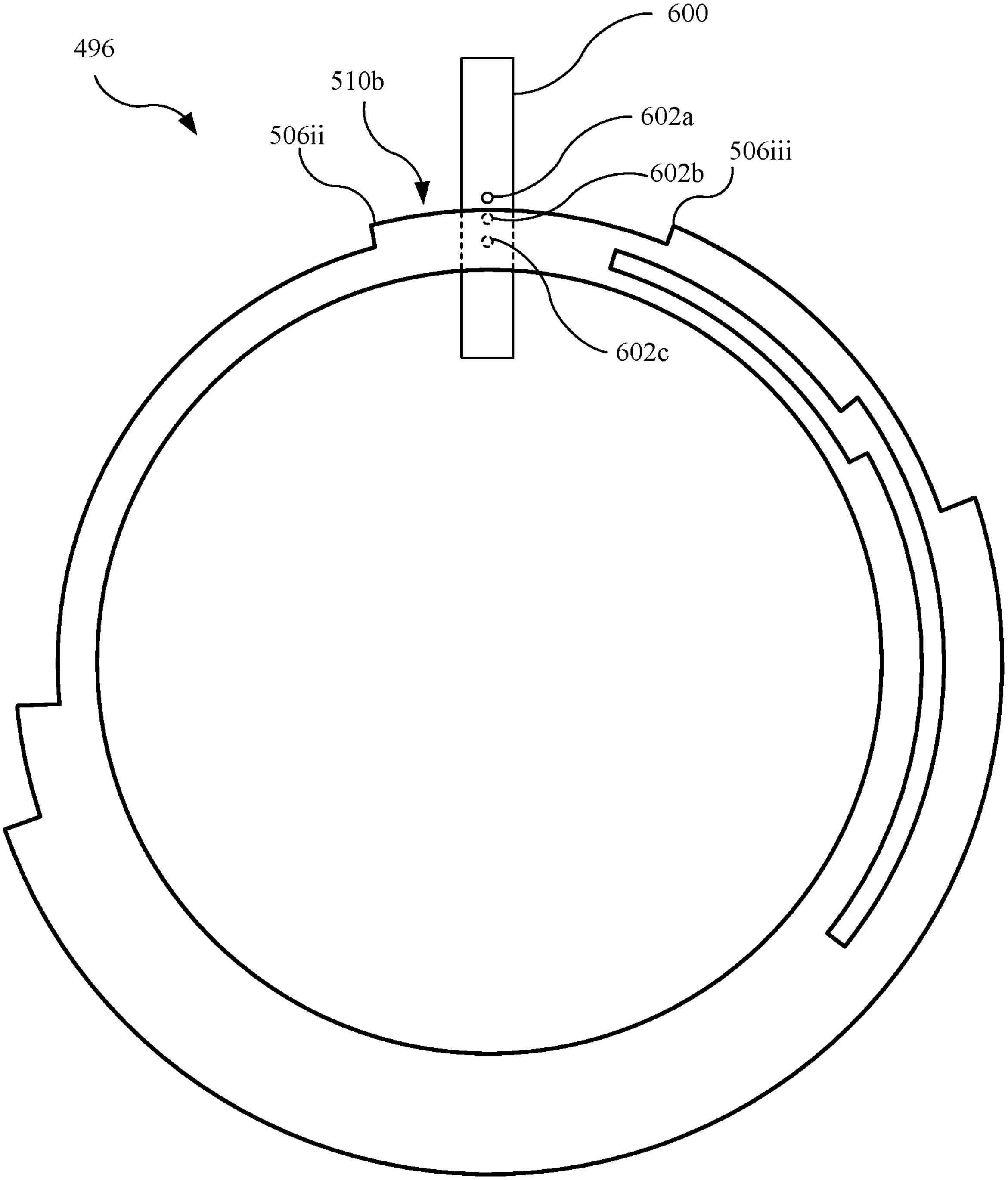
FIG. 8 is a front view of the gear plate seen in FIG. 6A shown in a second angular position relative to the sensor.
Figure 10:
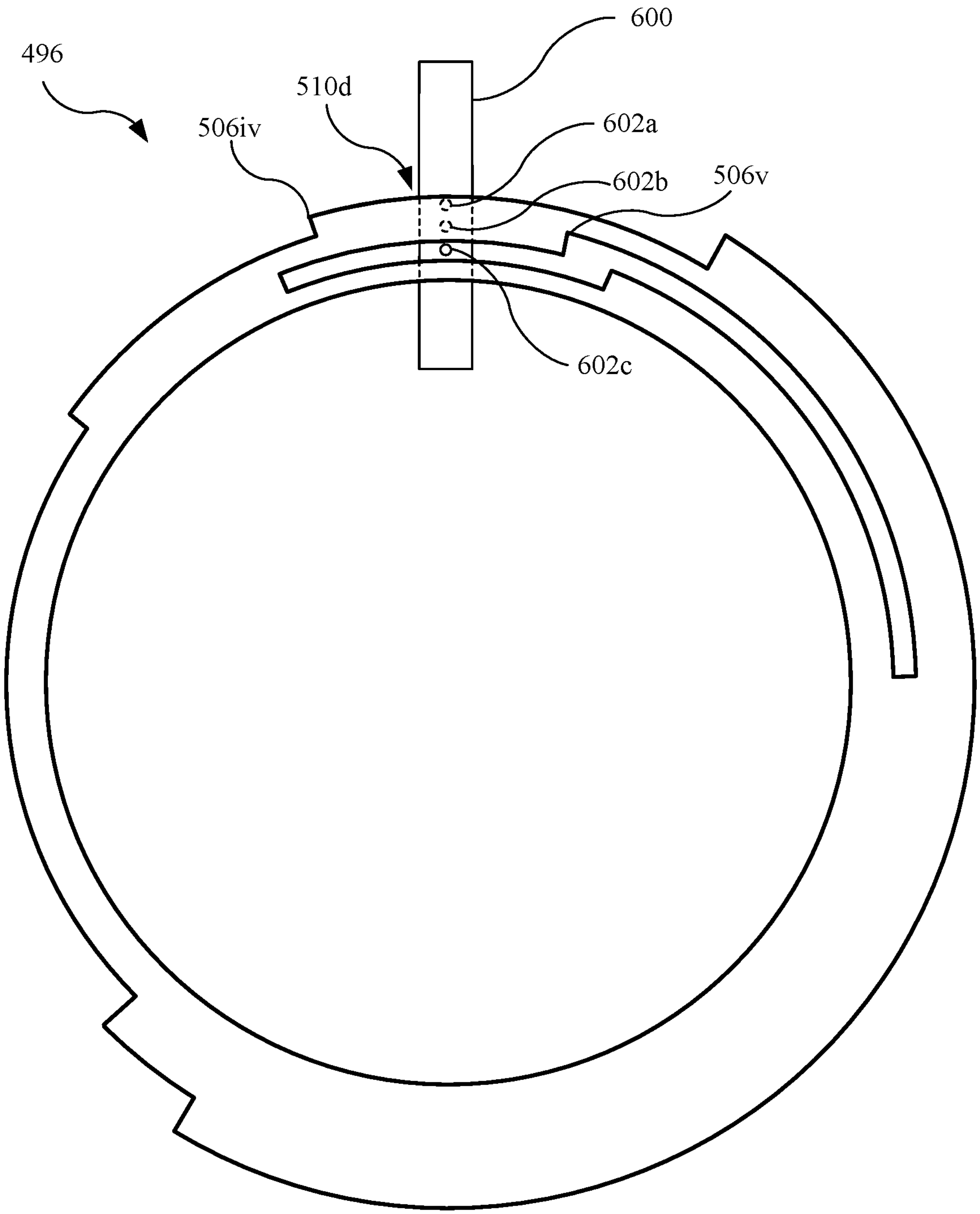
FIG. 10 is a front view of the gear plate seen in FIG. 6A shown in a fourth angular position relative to the sensor.
Figure 11:
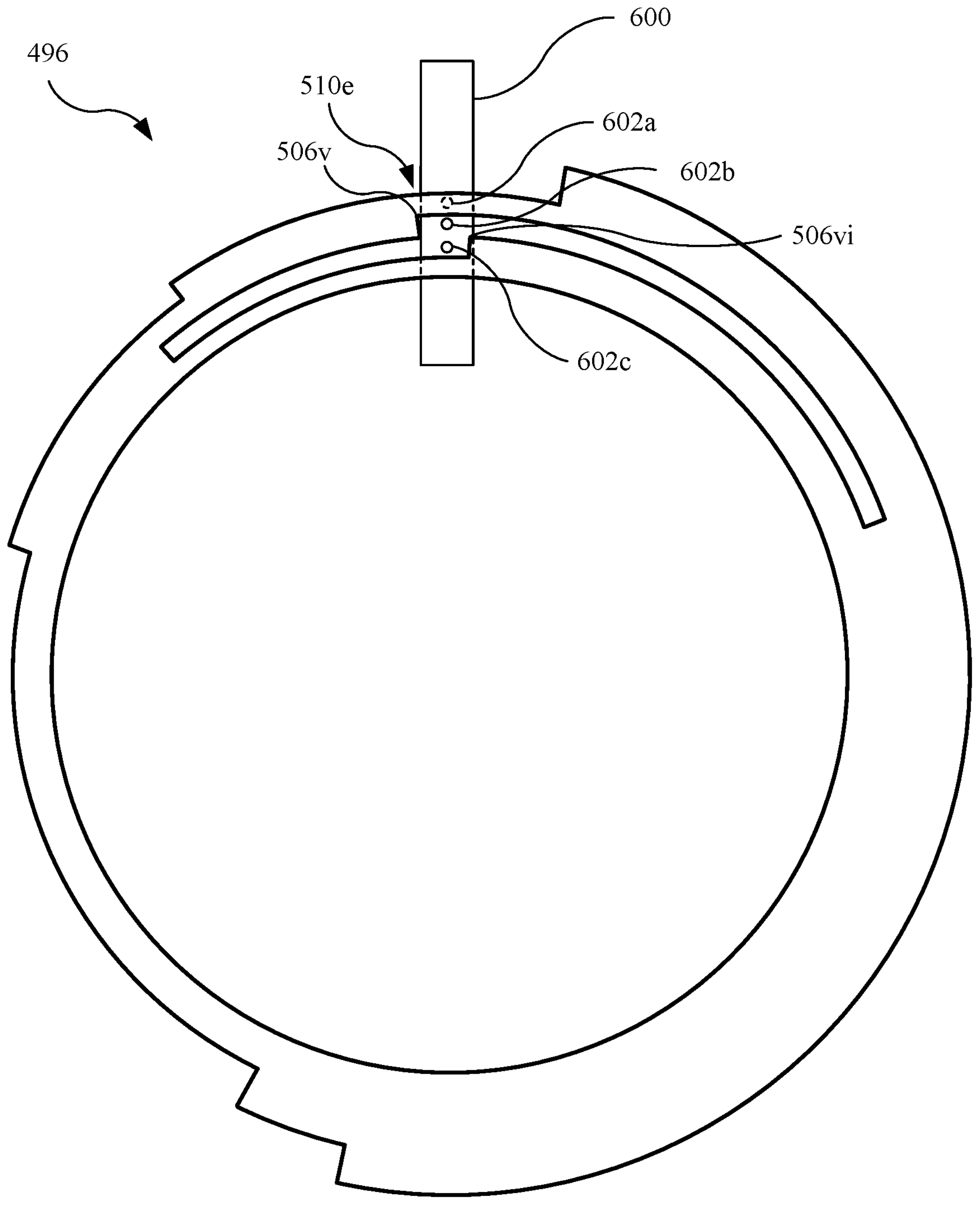
FIG. 11 is a front view of the gear plate seen in FIG. 6A shown in a fifth angular position relative to the sensor.

FIG. 7 illustrates positioning of the gear plate 496 such that the sensor 600 is located within zone 510*a*, between reference points 506*i*, 506*ii*. In this position, the switches 602*a*, 602*b* each detect the absence of material and the switch 602*c* detects the presence of material, thus resulting in a 3-bit binary output by the sensor 600 of 0-0-1. As the gear plate 496 rotates in the direction indicated by arrow 1, the sensor 600 moves through zones 510*b*-510*f*, which results in changes to the binary code output by the sensor 600. FIG. 8, for example, illustrates positioning of the gear plate 496 such that the sensor 600 is located within zone 510*b*, between reference points 506*ii*, 506*iii*. In this position, the switches 602*b*, 602*c* each detect the presence of material and the switch 602*a* detects the absence of material, thus resulting in a 3-bit binary output by the sensor 600 of 0-1-1. As the sensor 600 enters zone 510*c* (FIG. 9), between reference points 506*iii*, 506*iv*, the switches 602*a*, 602*c* each detect the absence of material and the switch 602*b* detects the presence of material, thus resulting in a 3-bit binary output by the sensor 600 of 0-1-0. Continued rotation of the gear plate 496 in the direction indicated by arrow 1 causes the sensor 600 to enter zone 510*d*, between reference points 506*iv*, 506*v*, as shown in FIG. 10. In this position, the switches 602*a*, 602*b* each detect the presence of material and the switch 602*c* detects the absence of material, thus resulting in a 3-bit binary output by the sensor 600 of 1-1-0. With reference to FIG. 11, as the sensor 600 enters zone 510*e*, between reference points 506*v*, 506*vi*, the switches 602*b*, 602*c* each detect the absence of material and the switch 602*a* detects the presence of material, thus resulting in a 3-bit binary output by the sensor 600 of 1-0-0. Finally, with reference to FIG. 12, as the sensor 600 enters zone 510*f*, between reference points 506*vi*, 506*vii*, the switches 602*a*, 602*c* each detect the presence of material and the switch 602*b* detects the absence of material, thus resulting in a 3-bit binary output by the sensor 600 of 1-0-1.

When used in conjunction with the transfer case 300 and the actuation system 361, the various zones 510*a*-510*f* are envisioned to correspond to stages of actuation of the transfer case 300 described above. For example, the transfer case 300 may be configured to operate in a two-wheel drive low-range configuration (e.g., "2 low"), a two-wheel drive high-range configuration (e.g., "2 high"), and a four-wheel drive high-range configuration (e.g., "4 high"), but not a four-wheel drive low-range configuration. As described above, the transfer case 300 changes between the low-range and the high-range with the gear reduction mechanism 310 being actuated by the gear reduction actuation mechanism 380 (i.e., by moving the gear reduction hub 322), and changes between two-wheel drive and four-wheel drive with the secondary torque transfer mechanism 351 actuated by the secondary torque transfer mechanism 370 (i.e., by compressing the clutch 352). As also described above, the gear reduction actuation mechanism 380 and the secondary torque transfer mechanism 370 are each operated by rotating the gear plate 496 in different stages of rotation. Thus, as illustrated in Table 1 below and as described further below, the state of the gear plate 496, which may be detected by the sensor 600, corresponds to the drive mode of the transfer case 300 (e.g., to states of the gear reduction mechanism 310 and of the secondary torque transfer mechanism 351).

The zone 510*d* corresponds to the first positive stage of rotation discussed above with respect to FIGS. 4-5, for example, when the drive gear assembly 390 is rotated by the motor 364 via the reduction gears 366 to operate the gear reduction actuator mechanism 380 for engaging the high range (see FIG. 10). It is also envisioned that movement of the sensor 600 through the zone 510*d* may correspond to movement of the gear reduction hub 322 into the first position. The sensor 600 being positioned in and moving through zone 510*d* may thus provide an output indicating a rotational position of the gear plate 496 corresponding to actively engage the high range of the gear reduction mechanism 310 with the gear reduction actuation mechanism 380, such as 1-1-0 as described above. The zone 510*d* may, as described above, have a distance A4 of 36.8 degrees, more, or less (e.g., between 30 and 50 degrees, as described above for the first positive stage of rotation).

TABLE 1

| Drive Gear Position/State | | | | Transfer Case State/Mode | |
|---|---|---|---|---|---|
| Zone | Range (deg) | Stage of Rotation | Sensor Code | Drive mode | Range/state Four-wheel/state |
| 510a | A1 (−72.3) | Second negative | 0-0-1 | Two low (2lo) | Range: Low/fully-engaged<br>4WD: disengaged |
| 510b | A2 (−37.3) | First negative | 0-1-1 | Between N/2lo | Range: Low/engaging<br>4WD: disengaged |
| 510c | A3 (3) | Gap center | 0-1-0 | Neutral (N) | Range: Neutral (disengaged)<br>4WD: disengaged |
| 510d | A4 (+36.8) | First positive | 1-1-0 | Between N/2hi | Range: High/engaging<br>4WD: disengaged |
| 510e | A5 (+5) | Gap positive | 1-0-0 | Two high (2hi) | Range: High/fully-engaged<br>4WD: disengaged |
| 510f | A6 (+68.9) | Second positive | 1-0-1 | Four high (4hi) | Range: High/fully-engaged<br>4WD: engaging/fully-engaged |

Movement of the sensor through zones 510*c*-510*f* may correspond to sequential actuation of the gear reduction mechanism 310 to engage the high range and the secondary torque transfer mechanism 351 to engage four-wheel drive. For example, the zone 510*c* may correspond to a neutral (N) position between the first positive and negative stages of rotation of the gear plate 496 (i.e., between stages for engaging the high and low ranges), the zone 510*d* may correspond to the first positive stage of rotation (i.e., for engaging the high range), the zone 510*e* may correspond to a gap between the first and second positive stages of rotation (e.g., after fully-engaging the high range and prior to engaging the four-wheel drive mode), and the zone 510*f* may correspond to the second positive stage of rotation (i.e., for engaging and/or full-engagement of the four-wheel drive mode).

Figure 9:
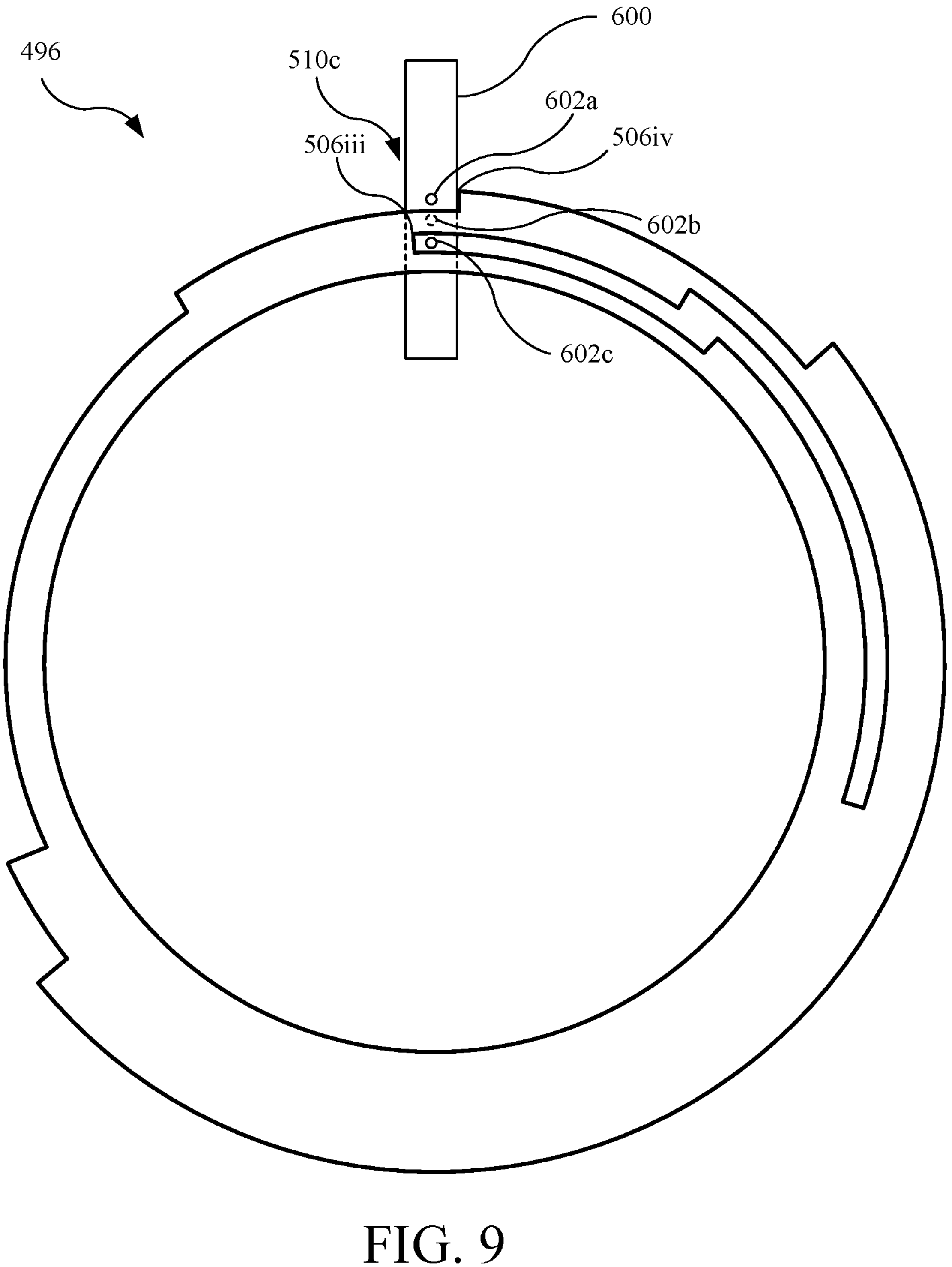
FIG. 9 is a front view of the gear plate seen in FIG. 6A shown in a third angular position relative to the sensor.

The zone 510*c* may correspond to a neutral (N) position of the gear reduction actuator mechanism 380 in which neither the low range, nor the high range, of the gear reduction mechanism 310 are engaged (see FIG. 9). For example, the zone 510*c* may be considered a center position or region (e.g., a gap) from which the various stages of rotation of the gear plate 496 originate but within which no actuation occurs. The sensor 600 being positioned in the zone 510*c* may thus provide an output indicating a rotational position of the gear plate 496 corresponding to the neutral (N) position of the gear reduction actuation mechanism 380, such as 0-1-0 as described above, thereby indicating the neutral (N) position in which neither the high range, nor the low range, are engaged or being engaged. The zone 510*c* may, as described above, have a distance A3 of 3 degrees, more, or less.

The zone 510*e* corresponds to a region or gap between the zone 510*c*, which corresponds to the first positive stage of rotation for engaging the high range (as described above), and the zone 510*e*, which corresponds to the second positive stage of rotation for engaging of the four-wheel drive mode (as described below) (see FIG. 11). The sensor 600 being positioned in and moving through the zone 510*e* may thus provide an output indicating a rotational position of the gear plate 496 corresponding to the high range of the gear reduction mechanism 310 being fully engaged and the four-wheel drive mode being fully disengaged (e.g., a two-wheel high mode), such as 1-0-0 as described above. The zone 510*e* may, as described above, have a distance A5 of 5 degrees, more, or less.

Figure 12:
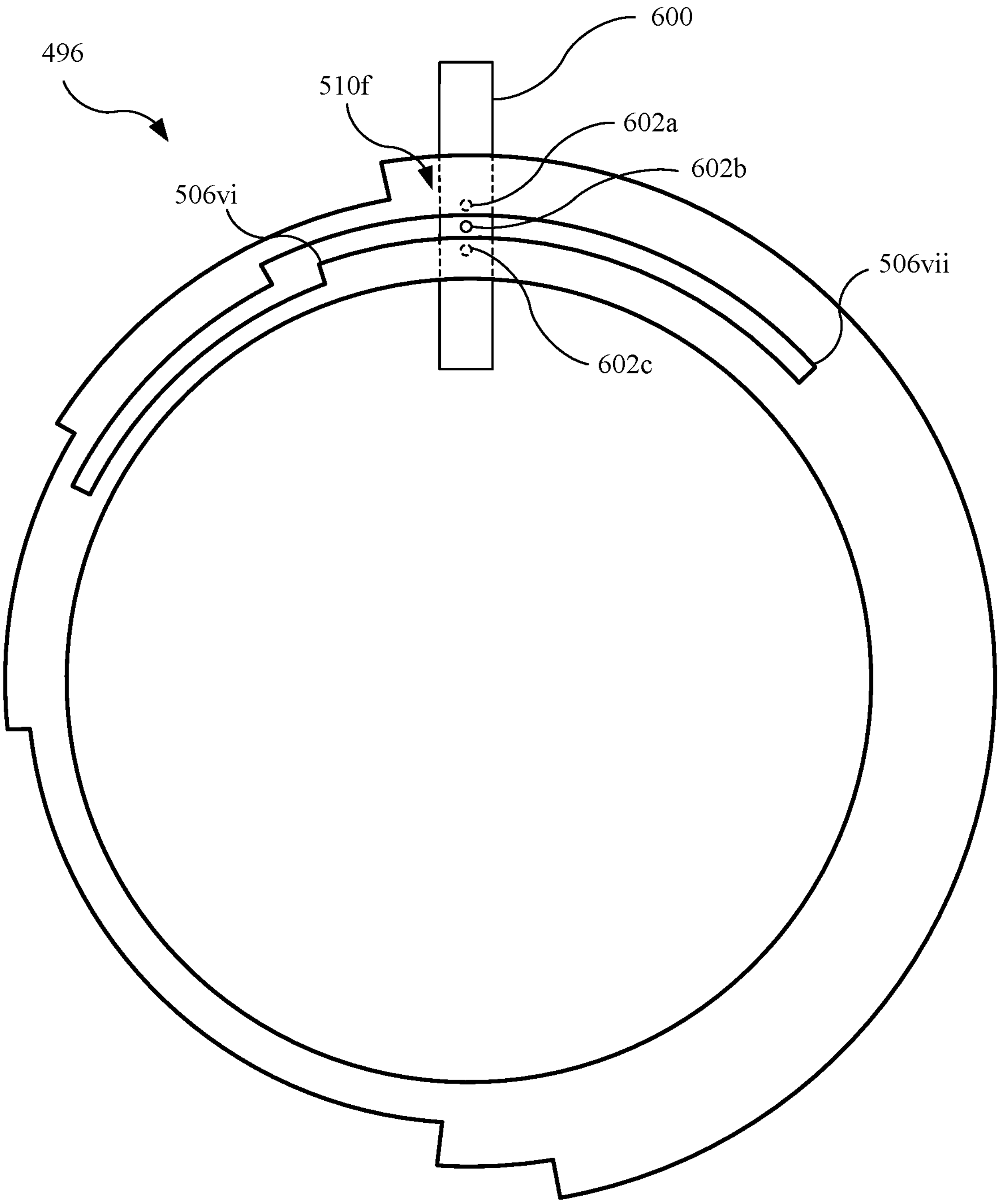
FIG. 12 is a front view of the gear plate seen in FIG. 6A shown in a sixth angular position relative to the sensor.

The zone 510*f* corresponds to the second positive stage of rotation discussed above for actuation of the secondary torque transfer mechanism 351 (see FIG. 12). The sensor 600 being positioned in and moving through the zone 510*f* may thus provide an output indicating a rotational position of the gear plate 496 corresponding to the high range of the gear reduction mechanism 310 being fully engaged and the four-wheel drive mode of the secondary torque transfer mechanism 351 actively engaging or being fully engaged (i.e., by gradually compressing the clutch 352), such as 1-0-1 as described above. The zone 510*f* may, as described above, have a distance A6 of 68.9 degrees, more, or less (between 10 and 30 degrees as described above for the second positive stage of rotation).

Additionally, the zone distance A6 may be subdivided to provide additional actuation functions, such as for actuating a four-wheel drive locking mechanism (e.g., in a latter portion of the distance A6) with the gear plate 496 providing an associated code therefor (e.g., with windows 502).

Movement of the sensor 600 through zones 510*a*-510*c* may correspond to actuation of the low range of the gear reduction mechanism 310. For example, the zone 510*c* may correspond to a neutral (N) position between the first positive and negative stages of rotation (i.e., for engaging high and low range), the zone 510*b* may correspond to the first negative stage of rotation (i.e., for engaging the low range), the zone 510*a* may correspond to a second positive stage of rotation (e.g., in which the low range is fully engaged).

As described above, the zone 510*c* may correspond to a neutral (N) position of the gear reduction actuator mechanism 380 in which neither the low range, nor the high range, of the gear reduction mechanism 310 are engaged (see FIG. 9).

The zone 510*b* corresponds to the first negative stage of rotation discussed above in which the drive gear assembly 390 is rotated by the motor 364 via the reduction gears 366 to operate the gear reduction actuator mechanism 380 to engage the low range (see FIG. 8). It is also envisioned that movement of the sensor 600 through the zone 510*b* may correspond to movement of the gear reduction hub 322 into the second position. The sensor 600 being positioned in and moving through the zone 510*b* may thus provide an output indicating a rotational position of the gear plate 496 corresponding to actively engage the low range of the gear reduction mechanism 310 with the gear reduction actuation mechanism 380, such as 1-1-0 as described above. The zone 510*b* may, as described above, have a distance A2 of 37.5 degrees, more, or less (e.g., between 350 and 50 degrees, as described above for the first stage of rotation).

The zone 510*a* corresponds to the second negative stage of rotation in which the low range is fully engaged (see FIG. 7). The zone 510*a* may not have a corresponding actuation function (e.g., the four-wheel drive mode is not engaged in low range). The sensor 600 being positioned in and moving through the zone 510*a* may thus provide an output indicating a rotational position of the gear plate 496 corresponding to the low range of the gear reduction mechanism 310 being fully engaged, such as 0-0-1 as described above. The zone 510*a* may, as described above, having a distance A1 of 72.3 degrees, more, or less. For example, the distance A1 may be significantly shorter and span a sufficient distance for the sensor to reliably determine that the gear plate 496 is in a position corresponding to the low range of the gear reduction mechanism 310 being fully engaged (e.g., 3-5 degrees, such as with the gaps associated with the zones 510*c*, 510*e*).

Alternatively, the distance A1 associated with zone 510*a* may have a corresponding actuation function (e.g., to engage the four-wheel drive mode in low range, or four low) with the gear plate 496 providing additional binary codes corresponding thereto for detection by the sensor 600. For example, the distance A1 of the zone 510*a* may be divided to provide a gap (e.g., similar to zone A5) corresponding to the low range being fully engaged and the four-wheel mode being fully disengaged), and a second negative stage of rotation (e.g., similar to zone A6) corresponding to the low range being fully engaged and the four-wheel mode being actuated (e.g., by compressing the clutch 352). The distance A1 may further be divided to operate an additional mechanism (e.g., a locking mechanism).

While the disclosure has been made in connection with what is presently considered to be the most practical and preferred embodiment, it should be understood that the disclosure is intended to cover various modifications and equivalent arrangements.

What is claimed is:

1. A transfer case comprising:

an input shaft;

a primary output shaft;

a secondary output shaft;

a gear reduction mechanism selectively operated to couple the input shaft to the primary output shaft in a high range and a low range;

a secondary torque transfer mechanism selectively operated to couple the primary output shaft to the secondary output shaft to engage a four-wheel drive mode; and an actuation mechanism for selectively operating the gear reduction mechanism and the secondary torque transfer mechanism, the actuation mechanism including:

a gear plate having a rotational axis with an integral target pattern formed therein, the gear plate being rotatable through a plurality of positions corresponding to states of the gear reduction mechanism and the secondary torque transfer mechanism and in which the integral target pattern differs; and a sensor adapted and positioned parallel to the rotational axis to read the target pattern in each of the positions of the gear plate, wherein the target pattern includes a plurality of windows and a plurality of solid areas wherein the windows extend through the gear plate along the rotational axis.

2. The transfer case of claim 1, wherein the windows and the solid areas collectively define a plurality of sectors spaced radially from a center point of the gear plate and a plurality of zones spaced angularly from one another.

3. The transfer case of claim 2, wherein the gear plate is rotatable in relation to the sensor such that rotation of the gear plate causes movement of the sensor through the zones.

4. The transfer case of claim 3, wherein the sensor is adapted to identify the windows and solid areas and assign a binary code to each of the zones.

5. The transfer case of claim 4, wherein the sensor includes a plurality of switches, each of the switches being adapted to identify the windows and solid areas.

6. The transfer case of claim 5, wherein the switches correspond in number to the sectors defined by the target pattern.

7. The transfer case of claim 6, wherein the switches are configured as Hall switches.

8. The transfer case of claim 6, wherein the sensor includes a first switch, a second switch, and a third switch and the target pattern includes a first sector, a second sector, and a third sector, the first switch being positioned such that rotation of the gear plate causes movement of the first switch through the first sector, the second switch being positioned such that the rotation of the gear plate causes movement of the second switch through the second sector, and the third switch being positioned such that the rotation of the gear plate causes movement of the third switch through the third sector.

9. The transfer case of claim 8, wherein the first sector is spaced a first radial distance from the center point of the gear plate, the second sector is spaced a second radial distance from the center point of the gear plate greater than the first radial distance, and the third sector is spaced a third radial distance from the center point of the gear plate greater than the second radial distance.

10. The transfer case of claim 9, wherein the target pattern includes a first zone spanning a first angular distance, a second zone spanning a second angular distance, a third zone spanning a third angular distance, a fourth zone spanning a fourth angular distance, a fifth zone spanning a fifth angular distance, and a sixth zone spanning a sixth angular distance.

11. The transfer case of claim 1, wherein a first position corresponds to a first state in which the low range is being engaged, and a second position corresponds to a second state in which the high range is being engaged.

12. The transfer case of claim 11, wherein a third position corresponds to a third state in which the high range is fully engaged and the four-wheel drive mode is being engaged.

13. The transfer case of claim 12, wherein a fourth position corresponds to a fourth state in which the high range is fully engaged and the four-wheel drive mode is not engaged.

14. The transfer case of claim 11, wherein a third position corresponds to a third state in which the high range and the low range are not engaged.

15. The transfer case of claim 1, wherein the gear plate is rotated to selectively operate the gear reduction mechanism and the secondary torque transfer mechanism.

16. The transfer case of claim 1, further comprising:

the target pattern collectively defining a plurality of sectors spaced radially from a center point of the gear plate and a plurality of zones spaced angularly from one another.

17. The transfer case of claim 16, wherein the gear plate is rotatable in relation to the sensor such that rotation of the gear plate causes movement of the sensor through the zones, and the sensor is adapted to identify the windows and solid areas and assign a binary code to each of the zones to identify the position of the gear plate.

18. The transfer case of claim 17, further comprising a motor that rotates the gear plate, a first actuation mechanism that is operated by the gear plate, and a second actuation mechanism that is operated by the gear plate.

* * * * *